United States Patent [19]
Libert et al.

[11] Patent Number: 5,175,789
[45] Date of Patent: Dec. 29, 1992

[54] DEVICE FOR POSITIONING AN OPTICAL FIBER SPLICE IN A SUPPORT

[75] Inventors: Jean-François Libert, Pont de Briques St Etienne; Jean-François Blondin, Coulogne, both of France

[73] Assignee: Alcatel Cable, Clichy Cedex, France

[21] Appl. No.: 762,984

[22] Filed: Sep. 20, 1991

[30] Foreign Application Priority Data

Sep. 20, 1990 [FR] France .................. 90 11619

[51] Int. Cl.⁵ .................. G02B 6/00; G02B 6/36
[52] U.S. Cl. .................. 385/136
[58] Field of Search .................. 385/136

[56] References Cited

U.S. PATENT DOCUMENTS 4,793,681 12/1988 Barlow et al. .................. 350/96.20

5,092,663 3/1992 Hivner .................. 385/136 X

FOREIGN PATENT DOCUMENTS 0175107 3/1986 European Pat. Off. .
0343588 11/1989 European Pat. Off. .

*Primary Examiner*—Akm E. Ullah
*Attorney, Agent, or Firm*—Sughrue, Mion, Zinn, Macpeak & Seas

[57] ABSTRACT

The device comprises a sleeve which is helically preformed and deformable, a substantially central portion of the sleeve receives the splice which may optionally be reinforced by a channel section trough. The splice deforms the central portion which is secured in a housing provided in a support. The device is applicable to optical undersea cables.

6 Claims, 2 Drawing Sheets

DEVICE FOR POSITIONING AN OPTICAL FIBER SPLICE IN A SUPPORT

The present invention relates to undersea optical cables.

FIELD OF THE INVENTION

It relates in particular to a device for positioning an optical fiber splice as formed on each of the individual optical fibers of a cable when repairing a damaged cable or link, with the splice then being mounted in a support.

BACKGROUND OF THE INVENTION

A splice on a fiber is larger in size than the fiber. It is mounted in a housing of a support, with the support also receiving splices on other fibers of the cable in other individual housings. The support serves to hold the various fiber splices and to reconstitute the functional and mechanical structure of the cable locally. The resulting assembly is mounted in a watertight box or "splice" box for protective purposes.

It is common practice for the support to be cylindrical and to have longitudinal grooves in its periphery. The housings provided on the support are longer and wider than the splices. This is because it is very difficult to predict the exact size of a splice, with the dimensions of different splices being slightly different from one another. This means that splices are free to move longitudinally and transversely in their housings.

Any such movement of a splice in its housing is highly damaging to the quality of the splice.

An object of the present invention is to avoid these problems by ensuring that a fiber splice is held in its support housing in a manner which is simple and particularly effective.

SUMMARY OF THE INVENTION

The present invention provides a device for positioning an optical fiber splice in a housing in a support, the dimensions of the housing being greater than the dimensions of the splice, wherein the device comprises a sleeve which is helically preformed and deformable, the initial transverse dimensions of the sleeve being less than those of the splice, the splice being received in the substantially central portion of the sleeve which is then secured by being clamped in said housing.

In some possible embodiments, the sleeve is held in the housing by its deformed central portion jamming in the width of the housing and/or by an outer tape clamping its deformed central portion against the bottom of the housing.

Advantageously, the splice is initially reinforced by a metal channel section trough in which the splice is secured and optionally embedded.

BRIEF DESCRIPTION OF THE DRAWINGS

Embodiments of the invention are described by way of example with reference to the accompanying drawings, in which.

DETAILED DESCRIPTION

Figure 1:
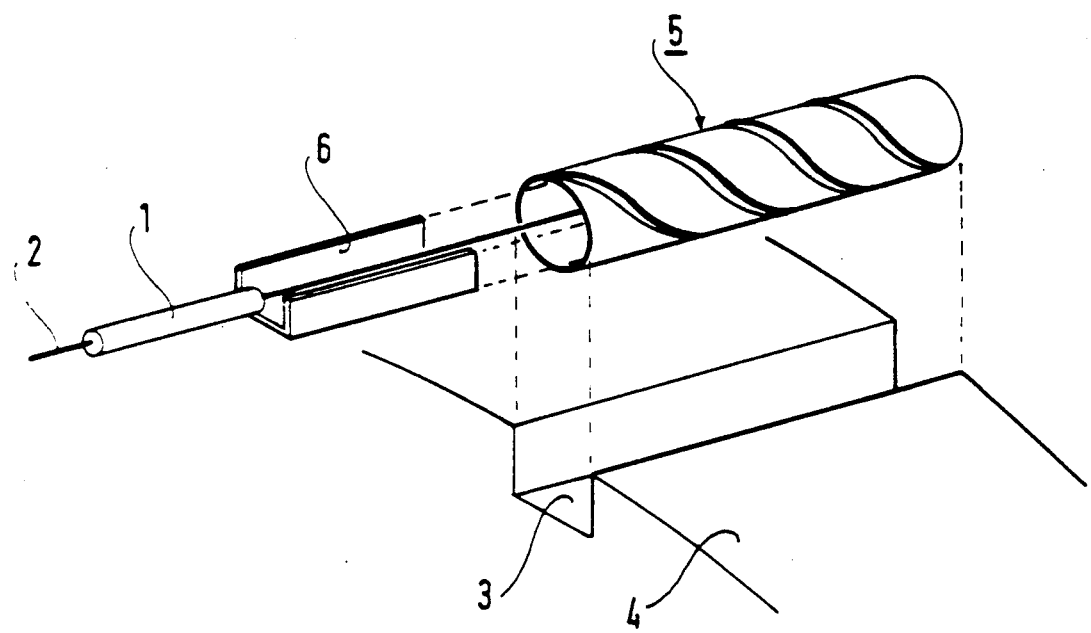
FIG. 1 is a diagrammatic exploded perspective view showing the device of the present invention for positioning a fiber splice in a support.

FIG. 1 shows a splice 1 formed on an optical fiber 2 and bulkier than the fiber itself. The splice is to be mounted in a housing 3 in a support 4, the support having other similar individual housings for receiving splices on other optical fibers of a cable. In the example shown, the housing for each splice is a groove extending lengthwise on a support that is cylindrical. The grooves are longer and wider than the various splices.

The device for positioning the splice 1 in its housing 3 comprises a sleeve 5 of a strip of material preformed into a helix and which is elastically radially deformable, the sleeve receiving the splice and serving to hold it in the housing 3. In addition, the splice 1 is preferably initially reinforced by a reinforcing trough 6 in which it is secured fixed prior to being mounted in the sleeve.

Figure 3:
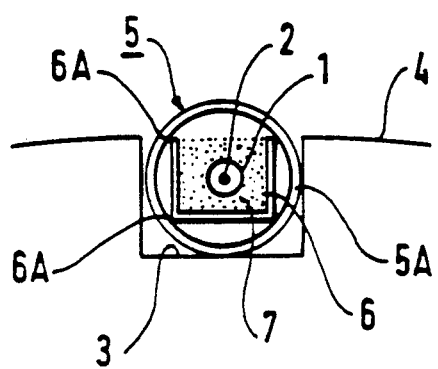
FIG. 3 is a diagrammatic end view corresponding to FIG. 2.
Figure 4:
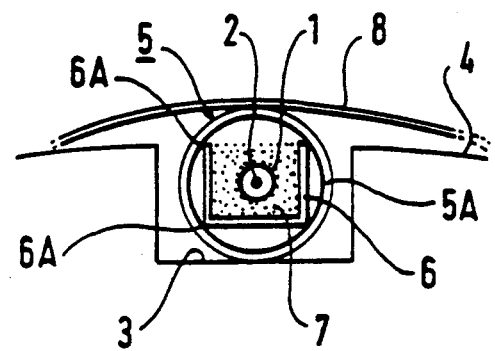
FIG. 4 is a diagrammatic end view given as a variant of FIG. 3.

The reinforcing trough 6 is preferably a length of steel channel section. The splice is installed and retained therein by gluing or by other means, being embedded inside the channel section of the trough in the glue or support material 7, as shown in FIGS. 3 and 4.

Initially, prior to receiving the splice reinforced in this way, the sleeve 5 has inside transverse dimensions that are smaller than the diagonal of the trough or of the resulting reinforced splice. Also initially, the turns of the helical strip sleeve are flat and substantially in contact with one another.

The sleeve 5 is preferably made of a plastic.

Figure 2:
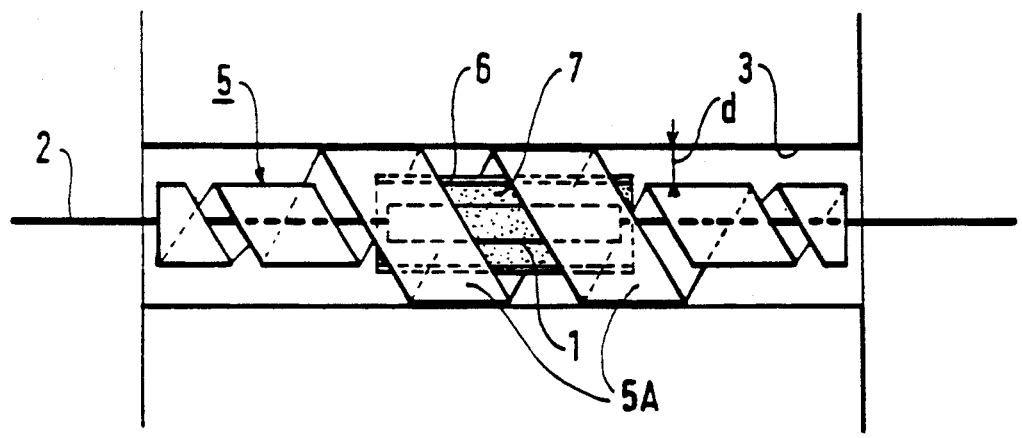
FIG. 2 is a diagrammatic plan view corresponding to FIG. 1 and showing the splice in position in its support.

FIG. 2 shows the splice 1 reinforced by the trough 6 and mounted inside the sleeve 5 which is itself received in the groove 3. The sleeve 5 is radially deformed by the presence of the reinforced splice inside it and located substantially in the middle 5A of the sleeve.

The middle 5A of the sleeve has adapted to the size of the reinforced splice: it has expanded correspondingly as indicated by its different outside clearance at the middle 5A compared with the clearance d at the end portions of the sleeve. Its turns have expanded and they no longer touch one another. The reinforced splice is securely held directly therein by the sleeve turns clamping on the edges 6A of the trough or on the corresponding reinforced splice, as can be seen in FIGS. 3 and 4. The non-deformed end turns of the sleeve contact the axial ends of the trough 6 to prevent the splice from moving longitudinally inside the sleeve.

In FIGS. 2 and 3, the splice is already secured in position inside the sleeve 5 and the sleeve is used directly to position the splice in the groove without any longitudinal or transverse play by means of the middle 5A of the sleeve jamming radially in the width of the groove 3.

In a variant shown in FIG. 4, the sleeve 5 is fixed in the groove 3 by an external holding tape 8. This tape may be in the form of a blade of metal that may be spring metal, or it may be an adhesive plastic tape, and it clamps the sleeve securely against the bottom of the groove, opposing any longitudinal or even transverse displacement of the sleeve in the groove. The tape surrounds and clamps the cylindrical support 4 to hold the different splices in their individual housings simultaneously.

The support 4 with the splices mounted therein in this manner provides the cable with good mechanical strength at its repair, without there being any internal play for the splices, while play is still possible for the fibers at either end of the splices. The support may optionally be associated with additional auxiliary means for mechanical reinforcement, and it may be covered to reconstitute the structure of the cable.

The support is mounted in conventional manner in a box that is proof against ingress of sea water (not shown) and referred to as a "splice" box.

Naturally the sleeve fixed in a groove by means of its deformed portion jamming across the width of the groove may be further secured by means of an additional outer tape as shown in FIG. 4 to guarantee that it is held very securely.

The sleeve also makes it possible to avoid any direct contact between the splice and the support (thermal contact, and also vibration).

We claim:

1. A device for positioning an optical fiber splice in a housing in a support, the transverse dimensions of the housing being greater than the radial dimension of the splice, wherein the device comprises a sleeve of a helically preformed and elastically deformable strip, the initial radial dimension of the helical strip sleeve being less than that of the splice, said splice being axially received in a substantially central portion of the sleeve and radially clamped in said housing by radial expansion of said central portion of said elastically deformable helical strip sleeve.

2. A device according to claim 1, wherein said sleeve has an initial transverse dimension that is perceptibly less than the width of said housing and is directly secured therein by the radially deformed sleeve central portion jamming in the width of the housing.

3. A device according to claim 1, further including external means on said support for clamping said deformed central portion of the sleeve against a bottom of said housing.

4. A device according to claim 1, wherein said elastically deformable helical strip sleeve is made of plastic.

5. A device according to claim 1, further including means for reinforcing said splice, said reinforcing means being constituted by a channel section trough in which the splice is secured by a holding material within the trough, thereby together defining a reinforced splice in said sleeve.

6. A device according to claim 5, wherein said trough is made of steel.

* * * * *